(12) United States Patent
Folan et al.

(10) Patent No.: US 6,254,416 B1
(45) Date of Patent: Jul. 3, 2001

(54) VIBRATOR MOTOR HOLDER

(75) Inventors: Eugene Folan, Renmore; Pat White, Ennis, both of (IR)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/574,056

(22) Filed: May 18, 2000

(51) Int. Cl.⁷ .................................................. H01R 3/100
(52) U.S. Cl. ............................................. 439/347; 310/81
(58) Field of Search ..................... 439/500, 347; 310/81, 91; 340/407; 429/97

(56) References Cited

U.S. PATENT DOCUMENTS

| | | | |
|---|---|---|---|
| 4,146,682 | * 3/1979 | Nakao | 429/97 |
| 5,211,579 | 5/1993 | Seong et al. | 439/500 |
| 5,586,907 | 12/1996 | Frantz et al. | 439/500 |
| 5,830,007 | 11/1998 | Fry et al. | 439/500 |
| 5,836,790 | * 11/1998 | Barnett | 439/500 |
| 5,943,214 | 8/1999 | Sato et al. | 361/752 |
| 5,980,309 | 11/1999 | Frantz et al. | 439/500 |
| 6,133,657 | * 10/2000 | Semenik et al. | 310/81 |

* cited by examiner

*Primary Examiner*—Neil Abrams
*Assistant Examiner*—Phuong Dinh
(74) *Attorney, Agent, or Firm*—Stephen Z. Weiss

(57) ABSTRACT

A vibrator motor holder for a wireless telephone vibrator motor is described. The holder is integrally formed on the I/O connector of the telephone. The holder comprises a device insertion cavity adapted to receive the vibrator motor. The inner walls of the cavity are dimensioned so as to correspond with the inserted vibrator motor, thereby ensuring a snug fit when the motor is contained therein. A locking piece is provided which is moveable across an entry port of the cavity. The obstruction of a portion of the entry port by the locking piece is sufficient to contain the motor within the cavity.

21 Claims, 6 Drawing Sheets

VIBRATOR MOTOR HOLDER

FIELD OF THE INVENTION

The invention relates to vibration motor holders and in particular to a vibration motor or vibrator holder integrally formed on an I/O connector of a wireless telephone.

BACKGROUND OF THE INVENTION

Vibration motors are well known in wireless telephones. They are typically used in situations where the user does not want an incoming call to activate an audible ringer and therefore switches the phone to the vibration mode. In the vibration mode an incoming call activates activates the motor and the resultant vibration is felt by the user as an indication of the incoming call.

Existing vibrating motors are difficult to assemble in the phone casing. Also, retention of the vibration motor once assembled is also difficult as the means for locking the motor in the housing is typically unable to cope with the vibrations resulting from the activity of the motor. If such a motor becomes loose within the phone casing it may damage the phone itself or other components within the casing. There is also a problem in that the existing vibration motor holders do not adequately transfer the vibrations to the casing and to the user, resulting in the possibility of the phone user missing the vibration and the call effecting the vibration.

Known vibration motors are typically housed within the casing by securing them with clips to corresponding holders within the casing. Other known holders not specifically designed for vibrator motors include those described in U.S. Pat. Nos. 5,211,579 and 5,830,007 of the present assignee, and U.S. Pat Nos. 5,586,907 and 5,980,309 assigned to the Whitaker Corporation. These all describe a connector for mounting a cylindrical electrical device.

In U.S. Pat. No. 5,211,579, a battery holder or housing is described. The holder is adapted to contain a cylindrical battery, the battery being inserted into the holder in a direction perpendicular to its longitudinal axis. The battery is held in place at one end by a round shoulder overhanging one end of the battery and at the other end by a detent in a flexible terminal which engages a projection at the opposite end of the battery.

U.S. Pat. No. 5,586,907 describes an alternative battery connector, this connector adapted to constrain a disk shaped battery. The battery is inserted in a direction parallel to its longitudinal axis. The battery is held in place by two opposed pliable locking arms which clip over the cylindrical wall of the battery.

In U.S. Pat. No. 5,830,007, a microphone device is inserted in a direction parallel to its longitudinal axis. A flexible locking arm contacts the circumferential surface of the microphone forcing the microphone into an interference fit in the housing. The locking arm also has a flange overhanging a portion of the flat surface of the microphone.

In U.S. Pat. No. 5,980,309, an alternative holder for disk shaped batteries is described. The battery is inserted in a direction parallel to its longitudinal axis, and is held in the housing with one pair of fixed arms with flanges which hand over one peripheral end of the device and with a pair of flexible arms with flanges which hang over an opposite peripheral end of the device.

Although these known holders are not designed specifically for holding vibration motors, a designer may consider the adaptation of the housing for such purposes. Such adaptation of the devices would not offer satisfactory retention of the vibrator motor, as the housings are not suited for retaining devices that actively vibrate. Therefore a need exists for a holder for electrical devices, the holder being adapted to securely retain the electrical device within a retained position.

SUMMARY OF THE INVENTION

The invention, which solves the problems in the prior art includes a housing for an electrical device where the housing is mountable within a wireless telephone. The has a device insertion cavity defined by side walls and a stop extending into the cavity. The inner surface of the side walls forming a cross section substantially corresponding to the cross section of the outer surface of the device to be housed. The cavity is adapted to receive and constrain at least a portion of the electrical device. The device may be inserted into the cavity through an entry port. A retaining device is provided to be moveable into a position that obstructs at least a portion of the entry port, thereby retaining the inserted device within the insertion cavity. When the retaining device is moved to an obstructing position, the inserted device is contained snugly within the cavity providing a secure retaining region for the electrical device.

The invention additionally provides an electrical connector for mounting an electrical device, including a housing having an electrical device insertion cavity defined by side walls and a stop extending into the cavity. The inner surface of the walls forming a cross section substantially corresponding to the cross section of the peripheral surface of the electrical device so that the device can be supported in the cavity. The cavity having an entry port through which the electrical device may be inserted. A locking piece is insertable into a slot in the housing adjacent to the entry port. When the locking piece is inserted into the slot at least a portion of the entry port is obstructed preventing the electrical device from moving out of the device insertion cavity, thereby restraining the device in a contained position. The electrical device is preferably a vibration motor adapted to vibrate when activated and is preferably mountable within a wireless telephone body, the mounting of the electrical connector providing a fixed and secure retention of the electrical connector against the telephone body, such that any vibration of the vibration motor within its housing is transmitted efficiently to the telephone body.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE DRAWINGS

Figure 1:
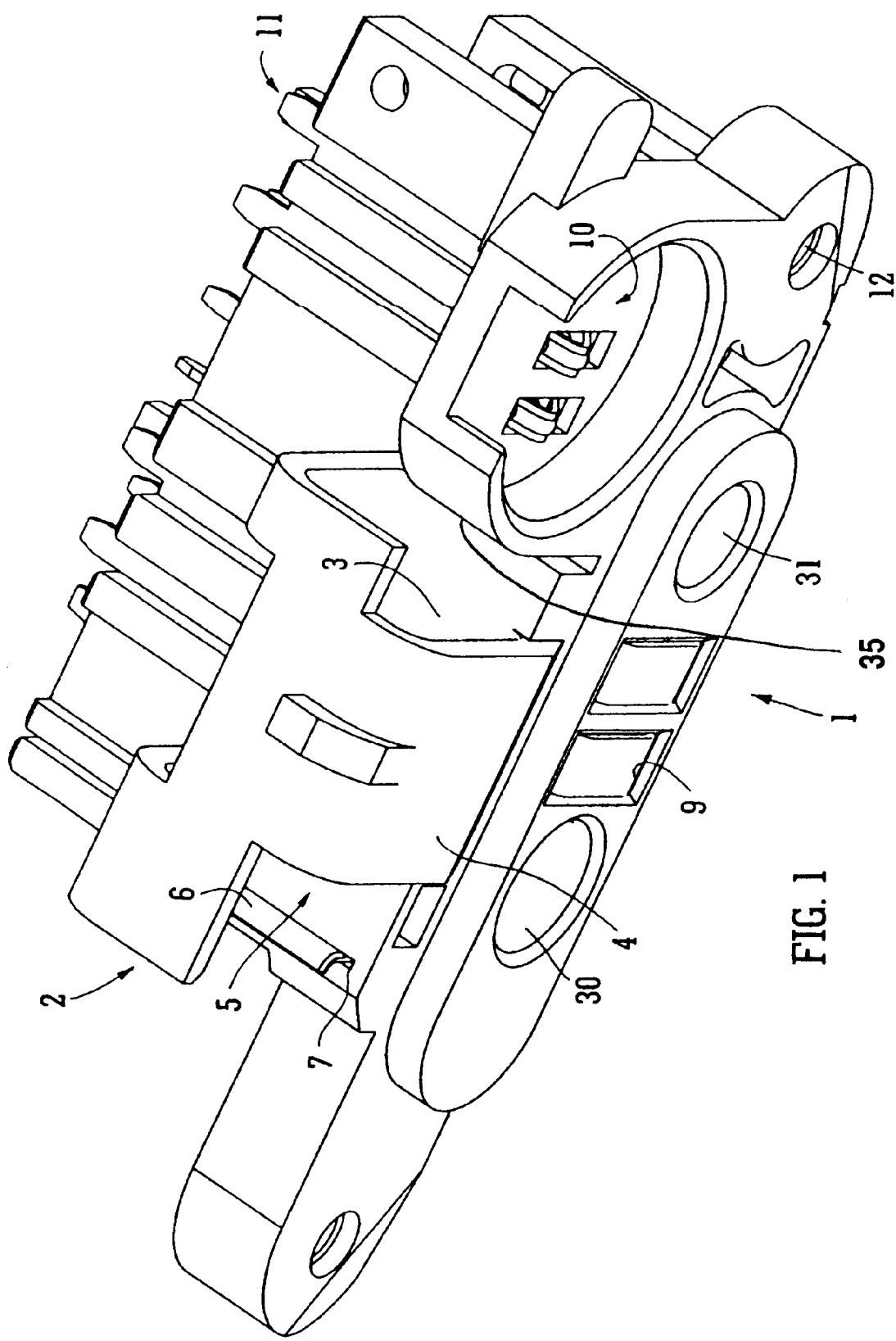
FIG. 1 is a perspective view of an electrical connector according to the present invention with no electrical device mounted within a housing of the connector.

FIGS. 1 to 4 show an electrical connector 1 for mounting an electrical device in accordance with the present invention. FIG. 1 shows the connector without the electrical device mounted therein. The connector has a housing 2 having an electrical device insertion cavity 3. Walls 4 of the cavity have an inner surface which form a cross section substantially corresponding to a cross section of a peripheral surface of the electrical device 8 to be inserted into the cavity 3, so that the device can be supported in the cavity. The cavity walls 4 defining in one face of the cavity an entry port 5 through which the electrical device may be placed into the cavity 3. A stop 35 extending into or defining an end of the cavity ensures that, when the device is fully inserted into the cavity, terminals on the bottom of the device 8 (not shown) will be in proper alignment with power terminals 37 which extend into the cavity 3. A locking piece 6 is insertable into a slot 7 in the housing 2 adjacent to the entry port 5, the insertion of the locking piece 6 into the slot 7 obstructing at least a portion of the entry port 5. As shown, the locking piece 6 is formed from metal, though any suitable alternative material may also be used.

Figure 2:
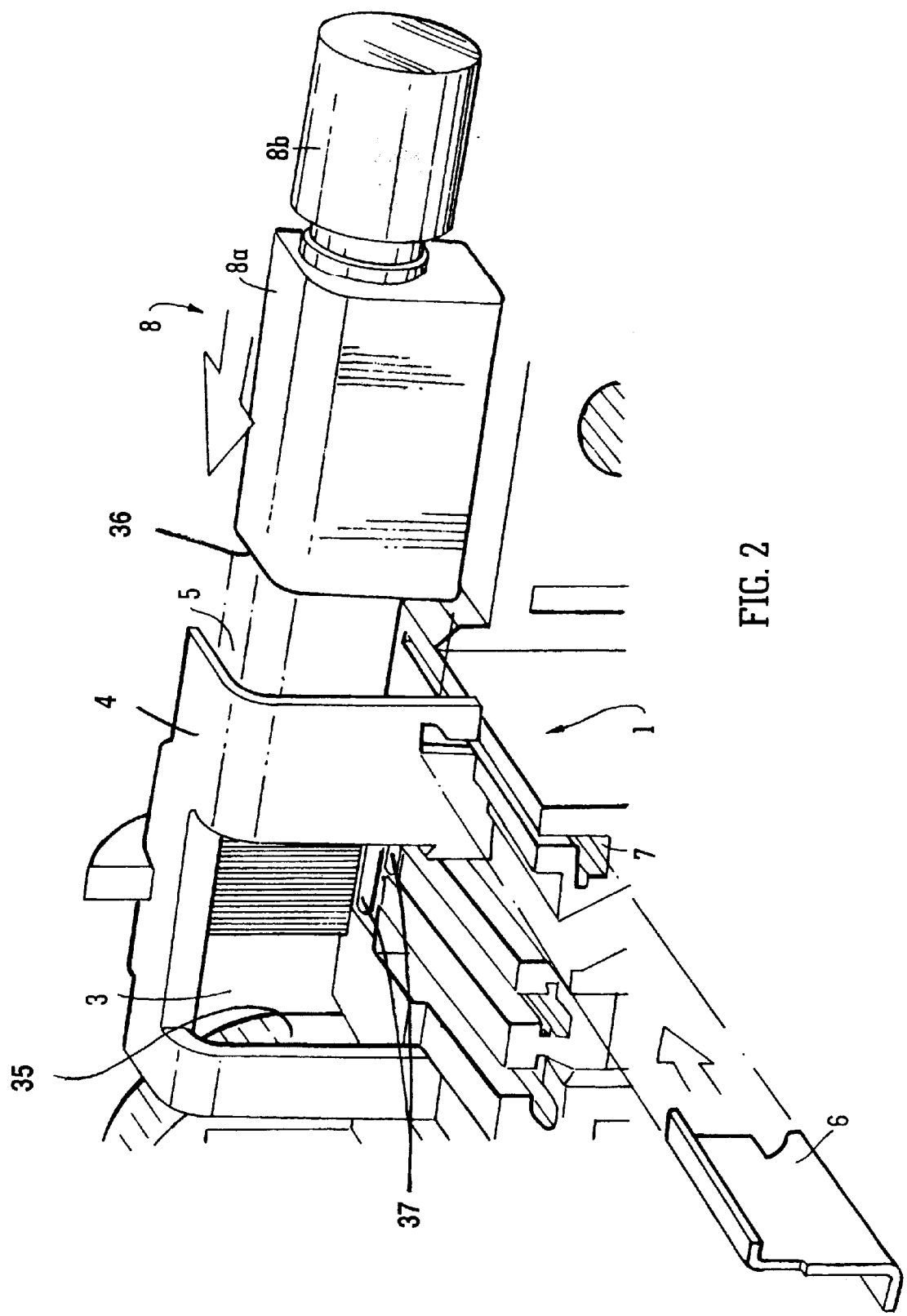
FIG. 2 shows the connector of FIG. 1 with the movement electrical device and looking piece outlined.
Figure 3:
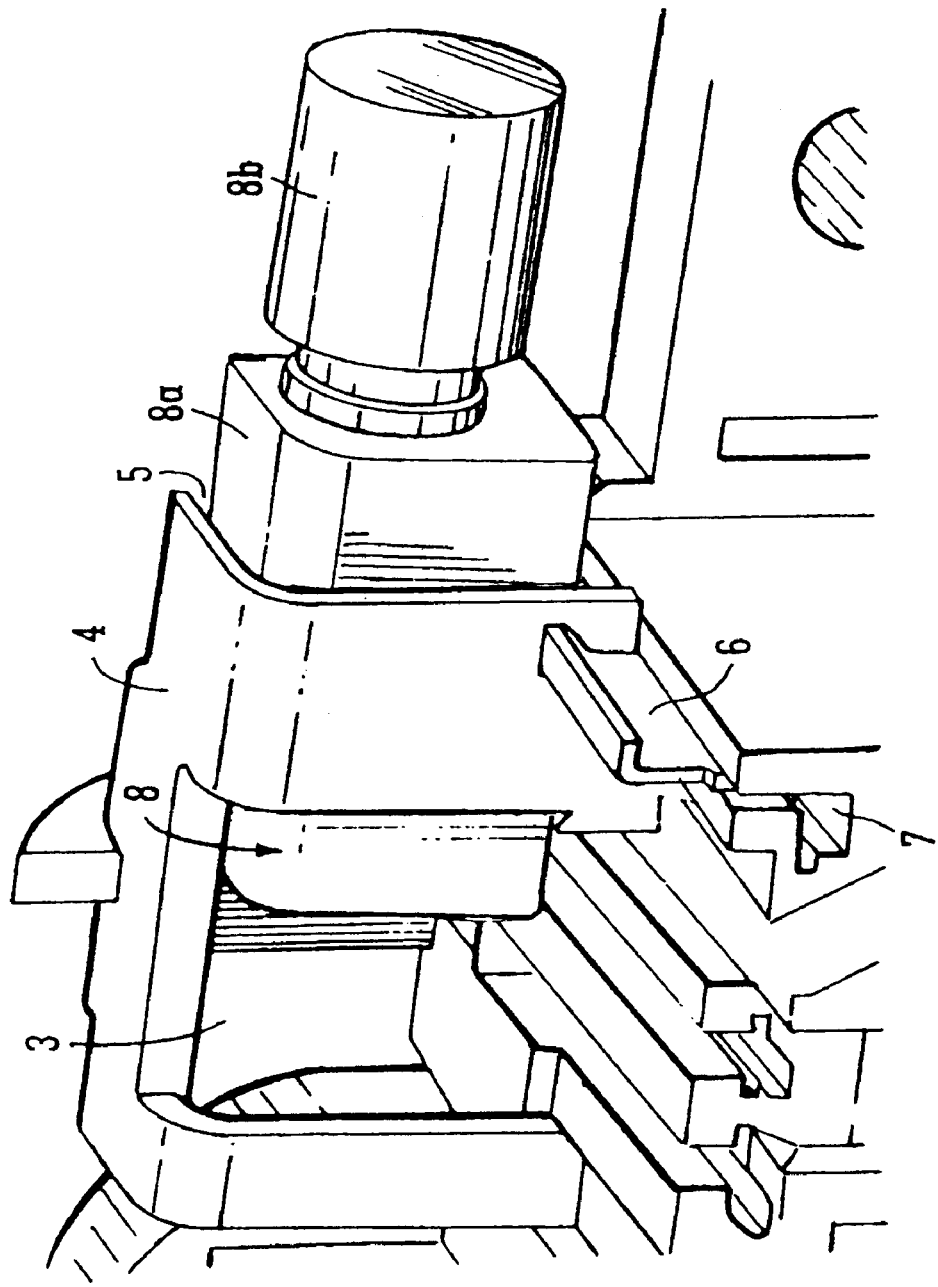
FIG. 3 is a view of the connector of FIG. 2 with the electrical device partially positioned within the housing.
Figure 4:
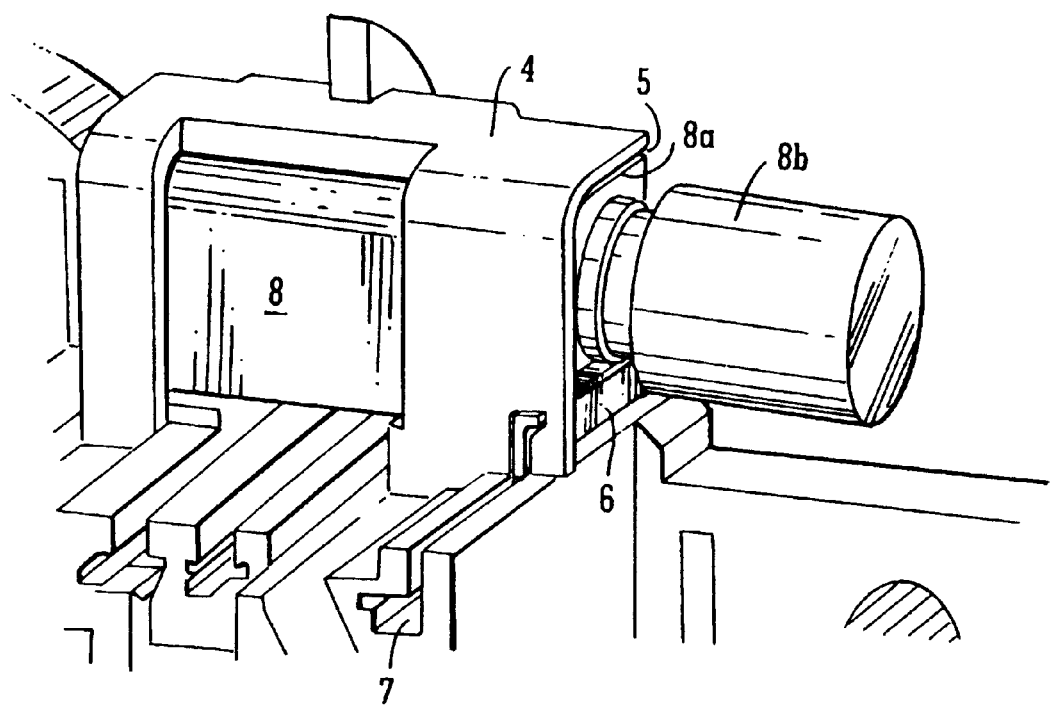
FIG. 4 shows the connector of FIG. 3 with the electrical device contained within the housing.

FIGS. 2 to 4 show a portion of the connector of FIG. 1 with an electrical device 8 in varying degrees of insertion into the cavity 3. The electrical device 8 is preferably a vibration motor having a motor body 8a, which is surrounded by a rubber sleeve, and an off-center shaft 8b which causes the vibration when the motor is activated. An example of the type of vibration or vibrator motor is that manufactured by the Matsushita Electric Industry Company Limited. In FIG. 3, the locking piece 6 is positioned within the slot 7, but not moved into a position whereby it obstructs the entry port 5. Once the vibrator motor 8 has been fully inserted into the cavity 3 ( as shown in FIG. 4), where a leading edge 36 of the device 8 is in contact with the stop 35, the locking piece 6 may be slid across the entry port 5 in the slot 7 so as to obstruct a portion of the entry port. The obstruction of the entry port prevents the vibration motor contained therein from falling or slipping out of the cavity 3, thereby holding the device in a contained position.

The electrical device 1 is preferably an input/output (I/O) connector for use in a wireless telephone. As such it incorporates a plurality of functional components in addition to the housing for the vibration motor. These typically include a recharger pads 9 adapted to cooperate with a power supply for recharging the wireless telephone, a housing 10 for a microphone (not shown), and a plurality of terminal connectors 11 for establishing an electrical connection between electrical device 1 and the remaining portion of the wireless telephone. The electrical device 1 is also provided with engagement means 12 adapted to secure the electrical device within the wireless telephone. The engagement means 12 are typically threaded apertures which co-operate with a screw or nut (not shown) so as to secure and retain the electrical device within the telephone. A DC power port 30 adapted for car recharging situations and/or a stereo jack connector 31 may additionally be provided.

Figure 5:
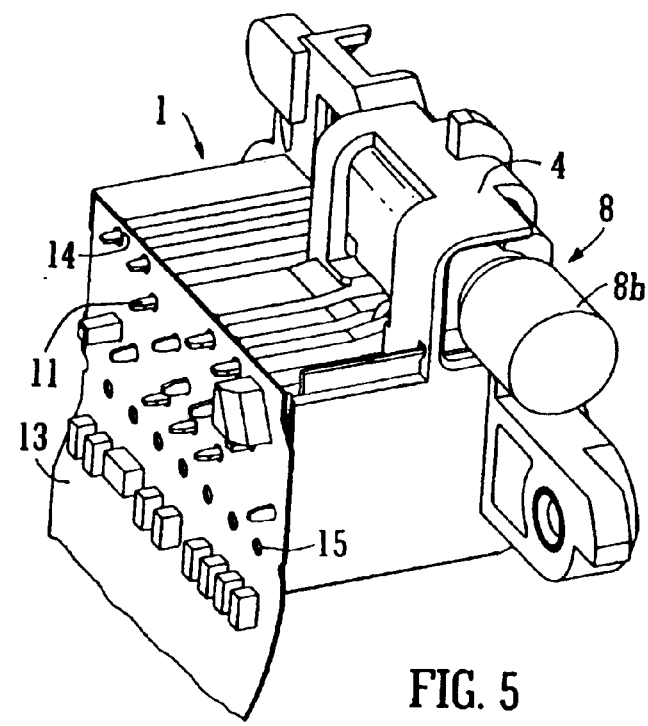
FIG. 5 is a perspective view of the connector of FIG. 4 with a flexible cable connector mounted thereon.

FIG. 5 shows the electrical device 1 with a portion of a flexible cable 13 mounted thereon. The flexible cable 13 is provided with a plurality of connection apertures 14 electrically connected to conductive strips (not shown) which are part of the cable 13. The apertures 14 are adapted to be soldered to terminals 11 on the device 1. The flexible cable electrically connects the electrical device 1 with the remainder of the wireless telephone (not shown). It will be appreciated by those skilled in the art that a small bend radius in the cable will take up less volume. The flexible cable 13 may additionally be provided with a plurality of bend apertures 15. These apertures 15 enable a bend region to be formed along the axis of the apertures 15. The provision of the apertures ensures that the bend region is formed with a small bend radius and thus take up less volume.

Figure 6:
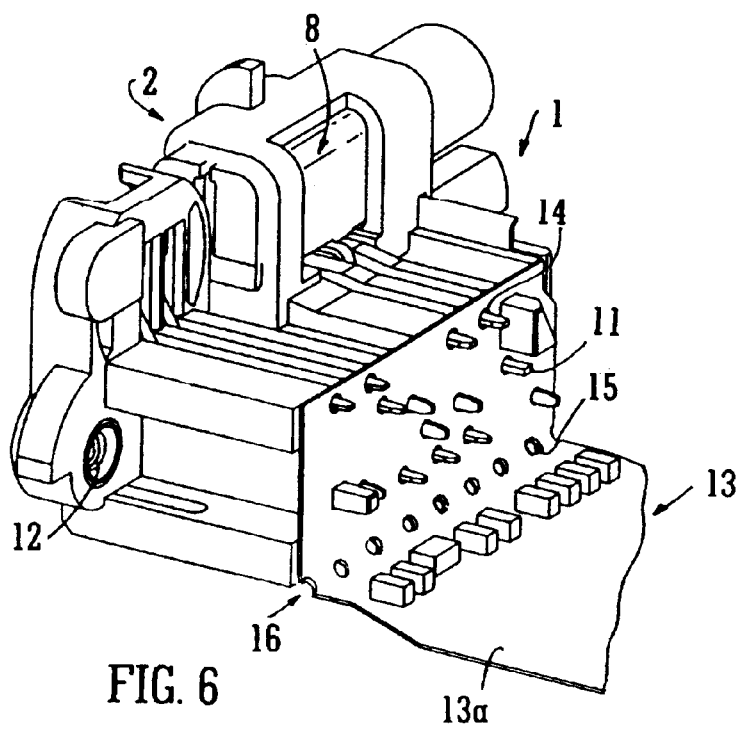
FIG. 6 shows the connector and cable assembly of FIG. 5 with a bend portion formed within the cable connector.

FIG. 6 shows the combined electrical device 1 and flexible cable 13 of FIG. 4 with a bend region or bend portion 16 formed therein. The bend portion 16 is formed with a small bend radius, typically in the range of 0.5 mm to 1.0 mm, and more preferably about 0.8 mm. The provision of the bend region 16 allows the connection region of the device 1 and connector 13 to be formed substantially perpendicular to a main portion 13a of the flexible connector 13, which is advantageous when mounting the device within an interior portion of a wireless phone casing 18, as shown in FIGS. 7 and 8.

Figure 7:
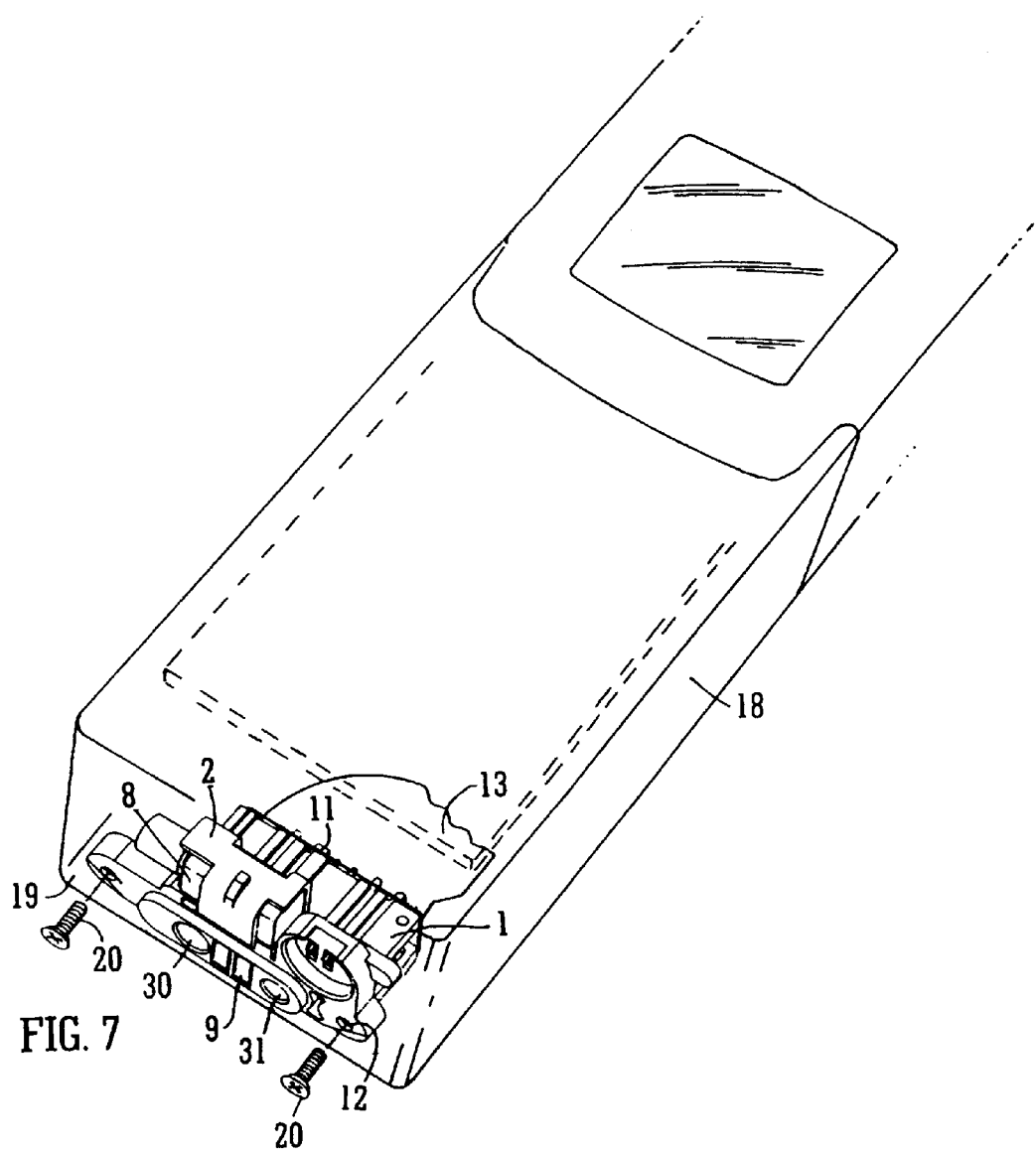
FIG. 7 shows the assembly of FIG. 6 mounted within a telephone body.
Figure 8:
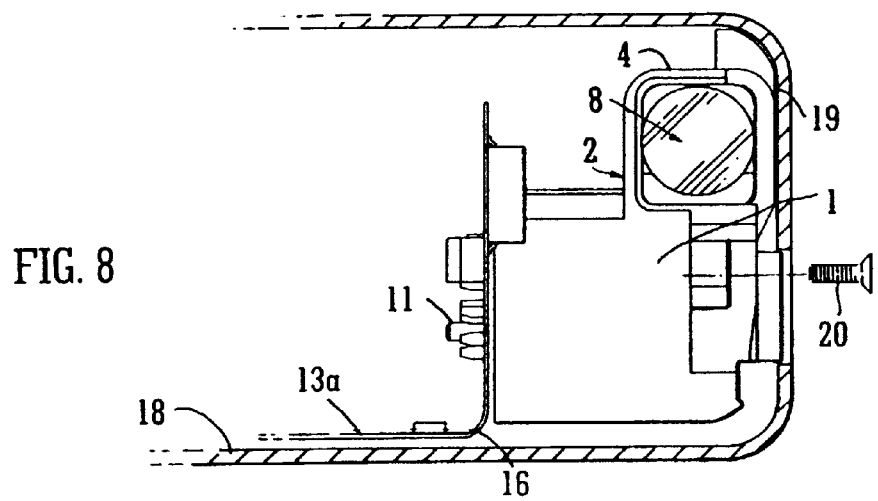
FIG. 8 is a section through the assembled connector of FIG. 7.

As shown in FIGS. 7 and 8 the device 1 is mounted and retained against a base portion 19 of the phone casing 18, with mounting screws 20 co-operating with the engagement apertures 12 of the electrical device 1. To effect mounting, the electrical device 1, with the vibrator motor 8 previously secured therein, is positioned within the phone casing 18, and retained therein by passing the mounting screws 20 though the base portion 19 and threading them through the co-operating engagement apertures 12 of the electrical device. The electrical device 1 is thereby securely retained within the phone casing 18.

It will be apparent to those skilled in the art that the invention may be embodied in other specific forms without departing from the spirit or central characteristics of the invnetion. The present examples and embodiments, therefore, are to be considered in all respects as illustrative and not restrictive, and the invention is not to be limited to the details given herein.

We claim:

1. A housing for an electrical device, the electrical device having a leading edge and a rear edge, the housing being mountable within a wireless telephone, the housing comprising:

a device insertion cavity having side walls and a stop extending into the cavity, the inner surface of the walls forming a cross section substantially corresponding to the cross section of the outer surface of the device to be housed, such that the cavity is designed to receive and constrain at least a portion of the device within the cavity;

an entry port through which the device may be inserted with the leading edge first into the cavity; and a retaining device having a contact edge with a length extending across the side walls of the cavity designed to engage the rear edge of the device, moveable within a channel in the housing, the channel extending a distance twice the length of the contact edge of the retaining device, into a position that obstructs at least a portion of the entry port and into contact with the rear edge of the electrical device, thereby retaining with said stop the inserted device within the insertion cavity.

2. The housing as claimed in claim 1 wherein the electrical device is a vibrator motor.

3. The housing as claimed in claim 1 wherein the retaining device is a latch, moveable between an open position, where the entry port is unobstructed and the electrical device is free to move into and out of the cavity, and a closed position where the entry port is at least partially obstructed thereby preventing the movement of the electrical device into or out of the cavity.

4. The housing as claimed in claim 3 further comprising a channel, at least a portion of the latch being slideable within the channel between the open and closed positions.

5. The housing as claimed in claim 1 further comprising terminals electrically engagable with corresponding terminals on the electrical device, the terminals being positioned adjacent the cavity such that on insertion of the electrical device fully into the cavity, when the leading edge of the electrical device engages the stop, the terminals adjacent the cavity and the terminals on the electrical device are in electrical engagement.

6. The housing as claimed in claim 1 wherein the housing is integrally formed on an electrical connector, the electrical connector having means for mounting the housing in the telephone.

7. The housing as claimed in claim 6 wherein the electrical connector further comprising means for receiving a microphone in the housing.

8. The housing as claimed in claim 6 wherein the electrical connector further comprises an electrical power connector, the electrical power connector connectable with a power supply.

9. The housing as claimed in claim 8 wherein the power supply is a battery recharging supply, the connection of the power supply with the electrical power connector effecting a re-charging of a battery within the wireless telephone.

10. An electrical connector for mounting an electrical device, the electrical device having a leading edge and a rear edge, comprising:
a housing having an electrical device insertion cavity with side walls and a stop extending into the cavity, the inner surface of the side walls forming a cross section substantially corresponding to a cross section of a peripheral surface of the electrical device so that the device can be supported in the cavity;
the cavity walls defining in one face of the cavity an entry port through which the electrical device with the leading edge first may be placed into the cavity; and
a locking piece having a contact edge, with a length extending across the side walls of the cavity, designed to engage the rear edge of the device, insertable into a slot in the housing adjacent to the entry port, the slot extending a distance twice the length of the contact edge of the locking piece, the insertion of the locking piece into the slot obstructing at least a portion of the entry port and into contact with the rear edge of the electrical device and preventing the electrical device from moving out of the device insertion cavity, thereby restraining with the stop the device in a contained position.

11. The electrical connector as claimed in claim 10 further comprising terminals adjacent the cavity engageable with terminals on the electrical device, the terminals adjacent the cavity being positioned such that on insertion of the electrical device fully into the cavity, when the leading edge of the electrical device engages the stop, the terminals adjacent the cavity and the terminals on the electrical device are in electrical engagement.

12. The electrical connector of claims 10 wherein said locking piece is slideable within the slot between an open position whereby the entry port is not obstructed and the electrical device can be inserted and removed from the device insertion cavity, and a closed position whereby the entry port is obstructed.

13. The electrical connector of claim 12 wherein said locking piece is made of stamped and formed metal.

14. The electrical connector of claims 12 wherein said locking piece is formed integral with the housing.

15. The electrical connector as claimed in claim 10 further comprising means for mounting the electrical connector within a wireless telephone.

16. The electrical connector as claimed in claim 15 electrically connectable to a printed circuit board within the telephone body, the electrical connection being effected by a flexible cable in contact with both the electrical connector and the printed circuit board.

17. The electrical connector as claimed in claim 16 further comprising connection terminals located substantially parallel to a base portion of the telephone, the flexible cable having holes or apertures defined therein adjacent to the electrical connector enabling the flexible cable to form a bend with a small bend radius, an end portion of the flexible cable being connectable with the connection terminals of the electrical connector.

18. An electrical connector for mounting an electrical device, the device having a peripheral surface, a leading edge and a rear edge, and a longitudinal axis generally parallel to the peripheral surface, comprising:
a housing having an electrical device insertion cavity forming a cross section corresponding to the cross section of the peripheral surface of the electrical device so that the device can be supported in the cavity, the device insertion cavity axis being parallel to the longitudinal axis of the device;
terminals adjacent the cavity designed to engage terminals on the electrical device;
a stop extending into the cavity contacting the leading edge of the device when the device is fully inserted in the cavity in a final position, so that the terminals adjacent the cavity and on the electrical device are in electrical engagement with one another when the device is in the final position; and
a locking piece, having a contact edge, with a length extending across the side walls of the cavity, designed to engage the rear edge of the electrical device, insertable into a slot in the housing in a direction perpendicular to the device insertion axis the slot extending a distance twice the length of the contact edge of the locking piece, the contact edge engaging the rear edge of the electrical device preventing the electrical device from moving out of the device insertion cavity and holding the device with the stop in the final position.

19. The electrical connector of claim 18 wherein said locking piece is insertable into said slot into a partially inserted position whereby the locking piece is not in engagement with the electrical device and whereby the electrical device can be inserted and removed from the device insertion cavity.

20. The electrical connector of claim 18 wherein said locking piece is made of stamped and formed metal.

21. The electrical connector of claims 18 wherein said locking piece is formed integral with the housing.

* * * * *